United States Patent
Dang

(10) Patent No.: US 10,769,254 B2
(45) Date of Patent: Sep. 8, 2020

(54) METHOD AND APPARATUS FOR IDENTIFYING USER BEHAVIOR OBJECT BASED ON TRAFFIC ANALYSIS

(71) Applicant: Huawei Technologies Co., Ltd., Shenzhen (CN)

(72) Inventor: Qian Dang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 15/965,315

(22) Filed: Apr. 27, 2018

(65) Prior Publication Data
US 2018/0247035 A1  Aug. 30, 2018

Related U.S. Application Data

(63) Continuation of application No. PCT/CN2016/082202, filed on May 16, 2016.

(30) Foreign Application Priority Data

Oct. 28, 2015 (CN) .......................... 2015 1 0713401

(51) Int. Cl.
*G06F 21/31* (2013.01)
*H04L 29/08* (2006.01)
(Continued)

(52) U.S. Cl.
CPC ............ *G06F 21/316* (2013.01); *G06K 9/62* (2013.01); *G06Q 30/02* (2013.01); *H04L 67/22* (2013.01); *H04L 67/306* (2013.01)

(58) Field of Classification Search
CPC ..... G06F 21/316; G06F 16/955; G06Q 30/02; G06K 9/62; G06K 9/6268; H04L 67/306; H04L 67/22
See application file for complete search history.

(56) References Cited

U.S. PATENT DOCUMENTS

| 2013/0046786 A1 | 2/2013 | Fabbri et al. |
| 2014/0143012 A1 | 5/2014 | Alon et al. |
| 2016/0364490 A1* | 12/2016 | Maugans, III ...... H04L 63/0407 |

FOREIGN PATENT DOCUMENTS

| CN | 102567899 A | 7/2012 |
| CN | 103136360 A | 6/2013 |

(Continued)

OTHER PUBLICATIONS

Machine Translation and Abstract of Chinese Publication No. CN102567899, Jul. 11, 2012, 9 pages.

(Continued)

*Primary Examiner* — Soe Hlaing
(74) *Attorney, Agent, or Firm* — Conley Rose, P.C.

(57) ABSTRACT

A method and an apparatus for identifying a user behavior object based on traffic analysis, where the method includes obtaining a network access log in a user data stream, identifying, according to a preset user knowledge repository, a network access behavior corresponding to the network access log, performing a semantic annotation on the network access log in order to obtain an annotated network access log, determining, according to a network access time and a behavior name in the annotated network access log, that a first log and a second log in the annotated network access log are associated events, where a behavior object corresponding to the second log is empty, and generating an intermediate event according to the associated events, where the intermediate event includes the user identity, a network access time corresponding to the second log, and a behavior object corresponding to the first log.

20 Claims, 4 Drawing Sheets

(51) Int. Cl.
*G06K 9/62* (2006.01)
*G06Q 30/02* (2012.01)

(56) References Cited

FOREIGN PATENT DOCUMENTS

| CN | 103218410 A | 7/2013 |
| CN | 103873320 A | 6/2014 |
| CN | 103905266 A | 7/2014 |
| CN | 104301148 A | 1/2015 |
| CN | 104599159 A | 5/2015 |
| CN | 104700289 A | 6/2015 |
| CN | 104731830 A | 6/2015 |
| CN | 104835066 A | 8/2015 |
| WO | WO/2015/096746 * | 7/2015 |

OTHER PUBLICATIONS

Machine Translation and Abstract of Chinese Publication No. CN103136360, Jun. 5, 2013, 16 pages.
Machine Translation and Abstract of Chinese Publication No. CN104599159, May 6, 2015, 13 pages.
Machine Translation and Abstract of Chinese Publication No. CN104700289, Jun. 10, 2015, 13 pages.
Machine Translation and Abstract of Chinese Publication No. CN104835066, Aug. 12, 2015, 15 pages.
Foreign Communication From a Counterpart Application, Chinese Application No. 201510713401.6, Chinese Office Action dated Mar. 4, 2019, 27 pages.
Hoxha, J., et al., "Enabling Semantic Analysis of User Browsing Patterns in the Web of Data," XP055510742, Apr. 17, 2012, 8 pages.
Foreign Communication From a Counterpart Application, European Application No. 16858626.1, Extended European Search Report dated Oct. 8, 2018, 7 pages.
Machine Translation and Abstract of Chinese Publication No. CN103218410, Jul. 24, 2013, 10 pages.
Machine Translation and Abstract of Chinese Publication No. CN103873320, Jun. 18, 2014, 22 pages.
Machine Translation and Abstract of Chinese Publication No. CN103905266, Jul. 2, 2014, 8 pages.
Machine Translation and Abstract of Chinese Publication No. CN104301148, Jan. 21, 2015, 8 pages.
Machine Translation and Abstract of Chinese Publication No. CN104731830, Jun. 24, 2015, 17 pages.
Foreign Communication From a Counterpart Application, PCT Application No. PCT/CN2016/082202, English Translation of International Search Report dated Aug. 22, 2016, 2 pages.
Foreign Communication From a Counterpart Application, PCT Application No. PCT/CN2016/082202, English Translation of Written Opinion dated Aug. 22, 2016, 6 pages.

* cited by examiner

METHOD AND APPARATUS FOR IDENTIFYING USER BEHAVIOR OBJECT BASED ON TRAFFIC ANALYSIS

CROSS-REFERENCE TO RELATED APPLICATIONS

This application is a continuation of International Patent Application No. PCT/CN2016/082202 filed on May 16, 2016, which claims priority to Chinese Patent Application No. 201510713401.6 filed on Oct. 28, 2015. The disclosures of the aforementioned applications are hereby incorporated by reference in their entireties.

TECHNICAL FIELD

Embodiments of the present disclosure relate to traffic identification technologies, and in particular, to a method and an apparatus for identifying a user behavior object based on traffic analysis.

BACKGROUND

In recent years, data services are growing explosively, and identification of a data stream of a user is an important research topic for an operator to perform network management and service optimization.

At present, a data stream is identified mainly using a machine learning method. The method further includes analyzing statistical characteristics of the data stream, such as duration, a port number, a packet length, and a time interval, according to a network access log of a user and a network communication data packet of a user that are included in the data stream, and classifying and identifying the data stream according to the statistical characteristics in order to study interests and preferences of the user. For example, regarding distribution of the port number, multiple data streams are classified and identified using an information entropy feature and a data mining technology. Alternatively, voice traffic is classified and identified by analyzing a correlation coefficient of the duration and the time interval of the data stream.

However, for a data stream processed using technologies such as port address translation and privacy protection, the operator cannot obtain statistical characteristics of the data stream by analyzing a network communication data packet of a user. That is, the operator cannot study interests and preferences of the user by identifying the data stream. As a result, the operator cannot provide a data service for the user according to the interests and the preferences of the user, and service quality of the data service is severely affected.

SUMMARY

Embodiments of the present disclosure provide a method and an apparatus for identifying a user behavior object based on traffic analysis such that an operator may study interests and preferences of a user according to the a behavior object, provide a data service for the user according to the interests and the preferences of the user, and improve service quality of the data service.

According to a first aspect, an embodiment of the present disclosure provides a method for identifying a user behavior object based on traffic analysis, including obtaining a network access log in a user data stream, identifying, according to a preset user knowledge repository, a network access behavior corresponding to the network access log, performing a semantic annotation on the network access log in order to obtain an annotated network access log, where the annotated network access log includes a user identity, a network access time, a behavior name, and a behavior object, determining, according to the network access time and the behavior name in the annotated network access log, that a first log and a second log in the annotated network access log are associated events, where a behavior object corresponding to the second log is empty, and generating an intermediate event according to the associated events, where the intermediate event includes the user identity, a network access time corresponding to the second log, and a behavior object corresponding to the first log. The user data stream is a data stream of a mobile terminal of the user that is obtained by an operator server. The user knowledge repository includes a correspondence between a uniform resource locator (URL) parsing rule, a key string, and a behavior identifier (ID), a correspondence between the behavior ID and the behavior name, and a correspondence between the key string and the behavior object. The network access behavior corresponding to the network access log includes at least a behavior name and a behavior object. The semantic annotation means that the network access behavior corresponding to the network access log is labeled. The associated events are multiple events whose behaviors are necessarily related and that occur successively. The behavior object being empty means that a behavior object corresponding to the network access log cannot be obtained according to the user knowledge repository. The intermediate event is used to study preference information of the user. According to the method for identifying a user behavior object based on traffic analysis provided in this embodiment, a user behavior and a behavior object are identified according to the network access log in the user data stream such that an operator studies interests and preferences of the user according to the behavior object, provides a data service for the user according to the interests and the preferences of the user, and improves service quality of the data service.

With reference to the first aspect, in a first possible implementation of the first aspect, determining, according to the network access time and the behavior name in the annotated network access log, that a first log and a second log in the annotated network access log are associated events includes determining, according to a behavior name corresponding to the second log, that the second log is a key event, and determining, according to a network access time corresponding to the first log and the network access time corresponding to the second log, that the first log and the second log are successively generated network access logs. In this embodiment, the key event is an event used to determine a user preference. The operator server determines the key event, and subsequently determines that the first log and the second log are successively generated network access logs in order to find out an associated event. Because a behavior object of the associated event is empty, a behavior object of the key event may be speculated according to an association relationship between the first log and the second log in order to study the user preference according to the behavior object of the key event, thereby providing an interested data service for the user, and helping the user obtain required information in time.

With reference to the first aspect or the first possible implementation of the first aspect, in a second possible implementation of the first aspect, the preset user knowledge repository includes a URL parsing rule repository, a behavior knowledge repository, and an object knowledge repository, and identifying, according to a preset user knowledge repository, a network access behavior corresponding to the network access log, and performing a semantic annotation on the network access log in order to obtain an annotated network access log includes parsing the network access log according to the URL parsing rule repository, and identifying the network access behavior corresponding to the network access log, determining, according to the network access behavior corresponding to the network access log and the behavior knowledge repository, a behavior name corresponding to the network access log, determining, according to the network access behavior corresponding to the network access log and the object knowledge repository, a behavior object corresponding to the network access log, and adding the determined behavior name and behavior object to the network access log to generate the annotated network access log. A URL parsing repository is used to store a URL parsing rule. The parsing rule further includes correspondences between different key strings and different behavior IDs or behavior object categories. The behavior knowledge repository includes a correspondence between the behavior ID and the behavior name, and is used to identify the behavior name corresponding to the network access log. The object knowledge repository includes a correspondence between the key string and the behavior object, and is used to identify the behavior object corresponding to the network access log. In this embodiment, the key string in the network access log is parsed according to the URL parsing rule repository, the behavior knowledge repository, and the object knowledge repository in the user knowledge repository, and the user behavior and the behavior object corresponding to the network access log are determined. The processing process is simple and precise, thereby helping the operator quickly and accurately obtain the preference information of the user and provide a better data service for the user.

With reference to any possible implementation of the first aspect, in a third possible implementation of the first aspect, the network access log is a commercial network access log.

With reference to the third possible implementation of the first aspect, in a fourth possible implementation of the first aspect, a behavior name corresponding to the first log is browsing, and the behavior name corresponding to the second log is adding to a cart or submitting an order.

Optionally, with reference to any possible implementation of the first aspect, in a fifth possible implementation of the first aspect, after identifying, according to a preset user knowledge repository, a network access behavior corresponding to the network access log, and performing a semantic annotation on the network access log in order to obtain an annotated network access log, the method further includes extracting target events from the annotated network access log according to a behavior name corresponding to the annotated network access log. Determining, according to the network access time and the behavior name in the annotated network access log, that a first log and a second log in the annotated network access log are associated events includes determining, according to the network access time and the behavior name in the annotated network access log, that a first log and a second log in the target events are associated events. In this embodiment, the target events are multiple events whose behaviors are associated with each other and that can determine a user preference. The target events are extracted from the annotated network access log, and only the target events are analyzed such that the associated events can be determined more quickly, thereby effectively improving efficiency of identifying a user behavior object.

Optionally, with reference to the fifth possible implementation of the first aspect, in a sixth possible implementation of the first aspect, after extracting target events from the annotated network access log, the method further includes dividing the user data stream within a preset time period into multiple data stream segments, where each data stream segment uses the key event as a destination of the data stream. In this embodiment, the user data stream is divided using the key event as a feature, and this is equivalent to a function similar to "classifying" the user data stream, thereby helping manage the user data stream.

According to a second aspect, an embodiment of the present disclosure provides an apparatus for identifying a user behavior object based on traffic analysis, including an obtaining module configured to obtain a network access log in a user data stream, an identification module configured to identify, according to a preset user knowledge repository, a network access behavior corresponding to the network access log, and perform a semantic annotation on the network access log in order to obtain an annotated network access log, where the annotated network access log includes a user identity, a network access time, a behavior name, and a behavior object, a determining module configured to determine, according to the network access time and the behavior name in the annotated network access log, that a first log and a second log in the annotated network access log are associated events, where a behavior object corresponding to the second log is empty, and a generation module configured to generate an intermediate event according to the associated events, where the intermediate event includes the user identity, a network access time corresponding to the second log, and a behavior object corresponding to the first log. The apparatus in this embodiment is configured to perform the method for identifying a user behavior object based on traffic analysis provided in the first aspect, of which implementation principles and beneficial effects are similar, and details are not described herein again.

With reference to the second aspect, in a first possible implementation of the second aspect, the determining module is further configured to determine, according to a behavior name corresponding to the second log, that the second log is a key event, and determine, according to a network access time corresponding to the first log and the network access time corresponding to the second log, that the first log and the second log are successively generated network access logs. In this embodiment, the determining module is configured to perform the method provided in the first possible implementation of the first aspect, of which implementation principles and beneficial effects are similar, and details are not described herein again.

With reference to the second aspect or the first possible implementation of the second aspect, in a second possible implementation of the second aspect, the preset user knowledge repository includes a URL parsing rule repository, a behavior knowledge repository, and an object knowledge repository, and the identification module is further configured to parse the network access log according to the URL parsing rule repository, and identify the network access behavior corresponding to the network access log, determine, according to the network access behavior corresponding to the network access log and the behavior knowledge repository, a behavior name corresponding to the network access log, determine, according to the network access behavior corresponding to the network access log and the object knowledge repository, a behavior object corresponding to the network access log, and add the determined behavior name and behavior object to the network access log to generate the annotated network access log. The apparatus in this embodiment is configured to perform the method provided in the second possible implementation of the first aspect, of which implementation principles and beneficial effects are similar, and details are not described herein again.

With reference to any possible implementation of the second aspect, in a third possible implementation of the second aspect, the network access log is a commercial network access log.

With reference to the third possible implementation of the second aspect, in a fourth possible implementation of the second aspect, a behavior name corresponding to the first log is browsing, and the behavior name corresponding to the second log is adding to a cart or submitting an order.

Optionally, with reference to any possible implementation of the second aspect, in a fifth possible implementation of the second aspect, the determining module is further configured to extract target events from the annotated network access log according to a behavior name corresponding to the annotated network access log, and determine, according to the network access time and the behavior name in the annotated network access log, a first log and a second log in the target events are associated events. The apparatus in this embodiment is configured to perform the method provided in the fifth possible implementation of the first aspect, of which implementation principles and beneficial effects are similar, and details are not described herein again.

Optionally, with reference to the fifth possible implementation of the second aspect, in a sixth possible implementation of the second aspect, the determining module is further configured to divide the user data stream within a preset time period into multiple data stream segments, where each data stream segment uses the key event as a destination of the data stream. The apparatus in this embodiment is configured to perform the method provided in the sixth possible implementation of the first aspect, of which implementation principles and beneficial effects are similar, and details are not described herein again.

According to a third aspect, an embodiment of the present disclosure provides a server, including a memory configured to store computer-executable program code, a transceiver, and a processor coupled to the memory and the transceiver, where the program code includes an instruction, and when the processor executes the instruction, the instruction enables a network element to perform the following operations obtaining a network access log in a user data stream, identifying, according to a preset user knowledge repository, a network access behavior corresponding to the network access log, and performing a semantic annotation on the network access log in order to obtain an annotated network access log, where the annotated network access log includes a user identity, a network access time, a behavior name, and a behavior object, determining, according to the network access time and the behavior name in the annotated network access log, that a first log and a second log in the annotated network access log are associated events, where a behavior object corresponding to the second log is empty, and generating an intermediate event according to the associated events, where the intermediate event includes the user identity, a network access time corresponding to the second log, and a behavior object corresponding to the first log. The memory is configured to store the user knowledge repository and the intermediate event. The server in this embodiment is configured to perform the method for identifying a user behavior object based on traffic analysis provided in the first aspect, of which implementation principles and beneficial effects are similar, and details are not described herein again.

According to a fourth aspect, an embodiment of the present disclosure provides a non-transitory computer readable medium for storing an instruction, where the instruction may be executed by one or more processors in order to complete the following operations obtaining a network access log in a user data stream, identifying, according to a preset user knowledge repository, a network access behavior corresponding to the network access log, and performing a semantic annotation on the network access log in order to obtain an annotated network access log, where the annotated network access log includes a user identity, a network access time, a behavior name, and a behavior object, determining, according to the network access time and the behavior name in the annotated network access log, that a first log and a second log in the annotated network access log are associated events, where a behavior object corresponding to the second log is empty, and generating an intermediate event according to the associated events, where the intermediate event includes the user identity, a network access time corresponding to the second log, and a behavior object corresponding to the first log. The memory is configured to store the user knowledge repository and the intermediate event.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
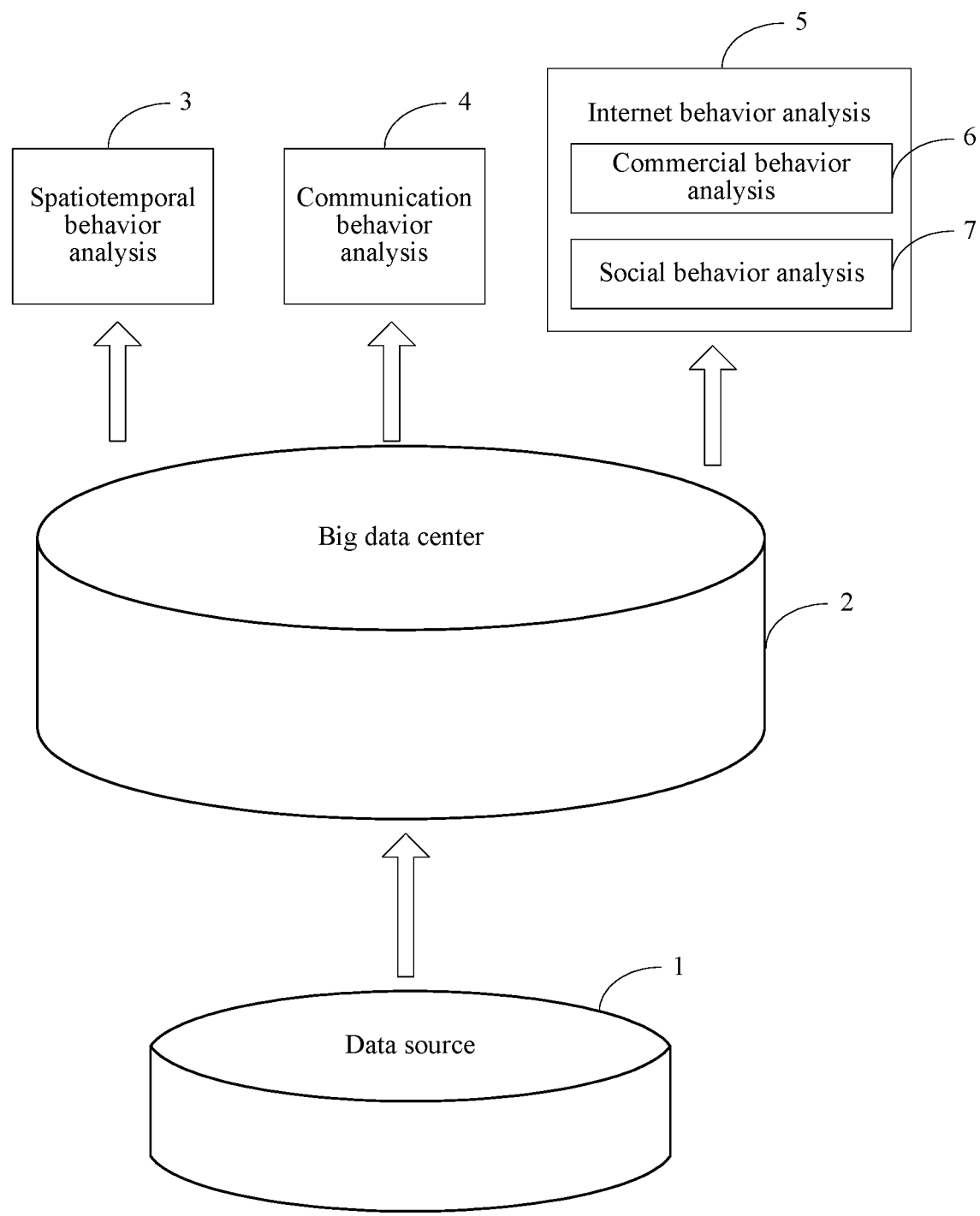
FIG. 1 is a schematic diagram of an application scenario of a method for identifying a user behavior object based on traffic analysis according to an embodiment of the present disclosure.

FIG. 1 is a schematic diagram of an application scenario of a method for identifying a user behavior object based on traffic analysis according to an embodiment of the present disclosure. As shown in FIG. 1, the scenario includes a data source 1, a big data center 2, and a behavior analysis. The behavior analysis may include a spatiotemporal behavior analysis 3, a communication behavior analysis 4, an Internet behavior analysis 5, and the like. The Internet behavior analysis 5 may include a commercial behavior analysis 6, a social behavior analysis 7, and the like. The data source 1 is a data stream of a mobile terminal of a user that is obtained by an operator, for example, a data stream of the mobile terminal of the user that is obtained by a mobile operator using Gn interfaces between a Serving General Packet Radio Service (GPRS) Support Node (SGSN) and an SGSN, and between an SGSN and a Gateway GPRS Support Node (GGSN). The big data center 2 is a centralized management control center for operator data, and collects and stores related data after processing data in the data source 1. The behavior analysis is analyzing the collected related data in the big data center 2 in order to obtain related information of the user, for example, obtain information about interests and preferences of the user, and subsequently pushing some information in which the user is interested to a mobile terminal application of the user. The method for identifying a user behavior object based on traffic analysis provided in the present disclosure mainly analyzes a commercial behavior of the user in order to study a preference of the user. The method may also be used to analyze other behaviors of the user, for example, a social behavior. The present disclosure is not limited thereto.

Figure 2:
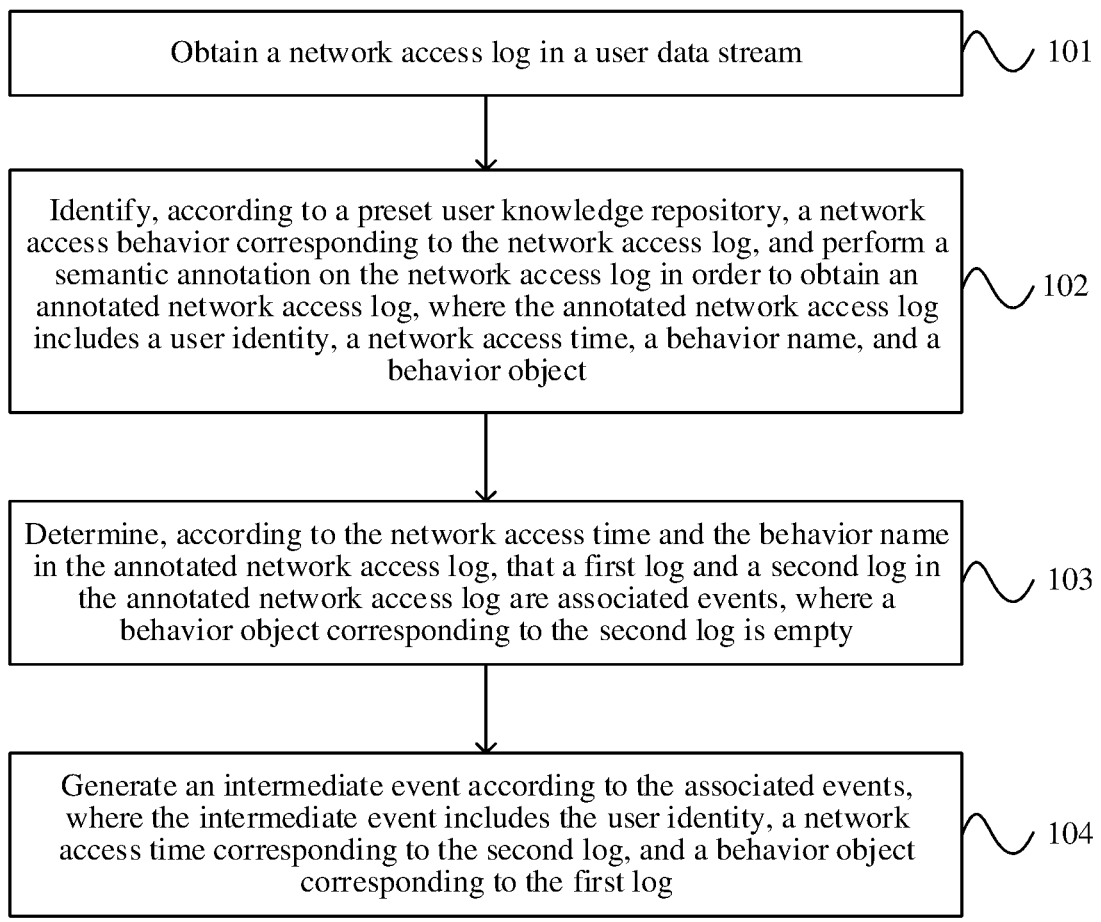
FIG. 2 is a flowchart of a method for identifying a user behavior object based on traffic analysis according to Embodiment 1 of the present disclosure.

FIG. 2 is a flowchart of a method for identifying a user behavior object based on traffic analysis according to Embodiment 1 of the present disclosure. This embodiment may be performed by an operator server. As shown in FIG. 2, the method includes the following steps.

Step 101. Obtain a network access log in a user data stream.

In this embodiment, the user data stream is a data stream of a mobile terminal of the user that is obtained by an operator server, for example, a network access log of a TAOBAO application in a mobile phone of a mobile user A. Table 1 shows a structure of a network access log provided in the present disclosure. As shown in Table 1, the network access log may include information such as a user identity, a URL, a Header (UA), an access time, CellID, traffic, and duration. The user identity may be information such as a phone number or a login name of the user that may identify the user. The URL is an address of a website accessed by the mobile terminal of the user. The Header (UA) is a header of the network access log, and the header is a word string sent by the server before transmitting HyperText Markup Language (HTML) data to a browser by means of the HyperText Transfer Protocol (HTTP). UA in the Header (UA) is a user agent. A function of the Header (UA) includes information about the browser used by the user, and may further include information such as a hardware platform, system software, and application software. The CellID indicates an ID of a cell that serves the mobile terminal of the user, and the mobile terminal of the user may be positioned according to the CellID. The traffic is information about traffic used by the mobile terminal of the user when accessing the website. The access time is a start time for accessing the website, and the duration indicates duration for which the mobile terminal of the user stays in the website. A start time and an end time of the network access log may be determined according to the access time and the duration.

TABLE 1

| User identity | URL | Header (UA) | Access time | CellID | Traffic | Duration |
| --- | --- | --- | --- | --- | --- | --- |

Step 102. Identify, according to a preset user knowledge repository, a network access behavior corresponding to the network access log, and perform a semantic annotation on the network access log in order to obtain an annotated network access log, where the annotated network access log includes a user identity, a network access time, a behavior name, and a behavior object.

In this embodiment, the user knowledge repository includes a correspondence between a URL parsing rule, a key string, and a behavior ID, a correspondence between the behavior ID and the behavior name, a correspondence between the key string and the behavior object, and the like. Further, the user knowledge repository may include a URL parsing rule repository, an object knowledge repository, a media knowledge repository, and a behavior knowledge repository. The URL parsing rule repository is used to represent the URL parsing rule, for example, parsing out a behavior ID of the user, a category of a behavior object, and a category of a media tool according to the key string. Because the URL parsing rule repository parses out a behavior ID, a category of a behavior object, and a category of a media tool, the behavior name of the user, the specific behavior object, and the media tool need to be further identified according to the object knowledge repository, the behavior knowledge repository, and the media knowledge repository. The object knowledge repository is used to identify the behavior object of the user, for example, identifying that the behavior object is a women's dress, a mobile phone, or milk powder. The media knowledge repository is used to identify the media tool used by the user, for example, identifying that the user uses the TAOBAO APP. The behavior knowledge repository is used to identify the behavior name of the user, for example, identifying that the behavior name of the user is login, search, browsing, or adding to a cart. It should be noted that in this embodiment, another knowledge repository may be further added to the user knowledge repository according to requirements. The present disclosure is not limited thereto.

In this embodiment, the network access behavior corresponding to the network access log includes at least a behavior name and a behavior object. For example, if the user searches for a mobile phone on TAOBAO, the behavior name in the network access behavior corresponding to the network access log is search, and the behavior object is a mobile phone. The semantic annotation means that the network access behavior corresponding to the network access log is labeled. For example, if the behavior ID corresponding to the network access log is identified to be 10002 according to the user knowledge repository, a semantic annotation corresponding to the behavior ID is commodity search.

The solution of step 102 is described in detail below using online shopping of the user as an example. Table 2 is a network access log provided in this embodiment. Table 2 shows only the user identity, the access time, and the URL in the network access log shown in Table 1, and the user identity is the phone number of the user. Table 3 is an annotated network access log provided in this embodiment. As shown in Table 2, the network access log includes the phone number of the user, and the access time, duration, and URL of accessing the website. A black font in the URL is the key string, and the key string is parsed according to the URL parsing rule repository in the user knowledge repository in order to identify the network access behavior corresponding to the network access log. For example, according to search.\*\*.com, it may be parsed out that the behavior name of the user is search. According to IPHONE 6s, it may be obtained that the behavior object is an IPHONE 6s phone. As shown in Table 3, the annotated network access log includes the phone number, the access time (for ease of description, the access time and the duration are equivalently replaced with a start time and an end time, the same below), the behavior name, and the behavior object of the user.

TABLE 2

Network access log

| User identity | Access time | Duration | URL |
|---|---|---|---|
| 15300000123 | 20141110 20:00:04 | 1 s | http://search.\*\*.com/emall/mobile/ mobileSearch.jsonp?set=5&iphone6s= school&channelId=MOBILE&yuyue=- 1&st=0&ci=&cityId=9173&ps=10&cp= 0&cf=&iv=-1&ct=-1&sp=&ifhf=0 |

TABLE 3

Annotated network access log

| User identity | Start time | End time | Behavior name | Behavior object |
|---|---|---|---|---|
| 15300000123 | 20141110 20:00:04 | 20141110 20:00:05 | Commodity search | IPHONE 6s |

Optionally, in this embodiment, the annotated network access log may further include information such as a pre-classification, a user position, and an application. The pre-classification is used to classify the behavior object of the user. For example, the user pays attention to mother and baby products and digital products. The user position is used to represent a position at which the mobile terminal of the user is located. The application includes information such as a client and the browser used by the user.

Step 103. Determine, according to the network access time and the behavior name in the annotated network access log, that a first log and a second log in the annotated network access log are associated events, where a behavior object corresponding to the second log is empty.

In this embodiment, as shown in Table 3, the network access time includes a start time and an end time. The associated events are multiple events whose behaviors are necessarily related and that occur successively. The behavior object being empty means that a behavior object corresponding to the network access log cannot be obtained according to the user knowledge repository. To protect data privacy, a key string, used to parse the behavior object, of the URL in the network access log is absent. Therefore, the behavior object corresponding to the network access log is empty. Table 4 is a group of annotated network access logs provided in this embodiment. As shown in Table 4, four annotated network access logs are marked as event 1, event 2, event 3, and event 4 according to a time sequence, respectively. According to features of online shopping, the user needs to browse a commodity before adding the commodity to a cart. Therefore, commodity browsing and adding to a cart are necessarily related. Moreover, the event 3 and the event 4 are two events that occur successively, and therefore, the event 3 and the event 4 are associated events. Because a data encryption is performed, a behavior object of adding to a cart cannot be identified according to the network access log.

TABLE 4

Annotated network access log

| Phone number | Start time | End time | Behavior name | Behavior object |
|---|---|---|---|---|
| 15300000123 | 20141110 20:00:04 | 20141110 20:00:04 | Commodity search | IPHONE |
| 15300000123 | 20141110 20:02:08 | 20141110 20:04:32 | Commodity browsing | IPHONE 5s |
| 15300000123 | 20141110 20:05:04 | 20141110 20:07:08 | Commodity browsing | IPHONE 6s |
| 15300000123 | 20141110 20:10:04 | 20141110 20:11:05 | Adding to a cart | Absent |

Step 104. Generate an intermediate event according to the associated events, where the intermediate event includes the user identity, a network access time corresponding to the second log, and a behavior object corresponding to the first log.

In this embodiment, the intermediate event is used to study preference information of the user. Interests and preferences of the user in a period may be studied according to the intermediate event in order to subsequently push related information to the user. For example, as shown in Table 4, if the first log is the event 3 and the second log is the event 4, the user identity in the intermediate event is the phone number 15300000123, the network access time is from 20141110 20:05:04 to 20141110 20:07:08, and the behavior object is IPHONE 6s. It may be learned, according to the intermediate event, that the user paid attention to an IPHONE 6s phone on Nov. 10, 2014. Subsequently, information related to the IPHONE 6s phone may be pushed to shopping APPs such as TAOBAO and JD.com in a mobile phone of the user whose phone number is 15300000123.

The method for identifying a user behavior object based on traffic analysis provided in this embodiment includes obtaining, by an operator server, a network access log in a user data stream, identifying, according to a preset user knowledge repository, a network access behavior corresponding to the network access log, and performing a semantic annotation on the network access log in order to obtain an annotated network access log including a user identity, a network access time, a behavior name, and a behavior object, determining, according to the network access time and the behavior name in the annotated network access log, that a first log and a second log in the annotated network access log are associated events, and generating an intermediate event according to the associated events such that an operator studies interests and preferences of a user by analyzing a behavior object in the intermediate event, and provides a data service for the user according to the interests and the preferences of the user in order to improve service quality of the data service.

Figure 3:
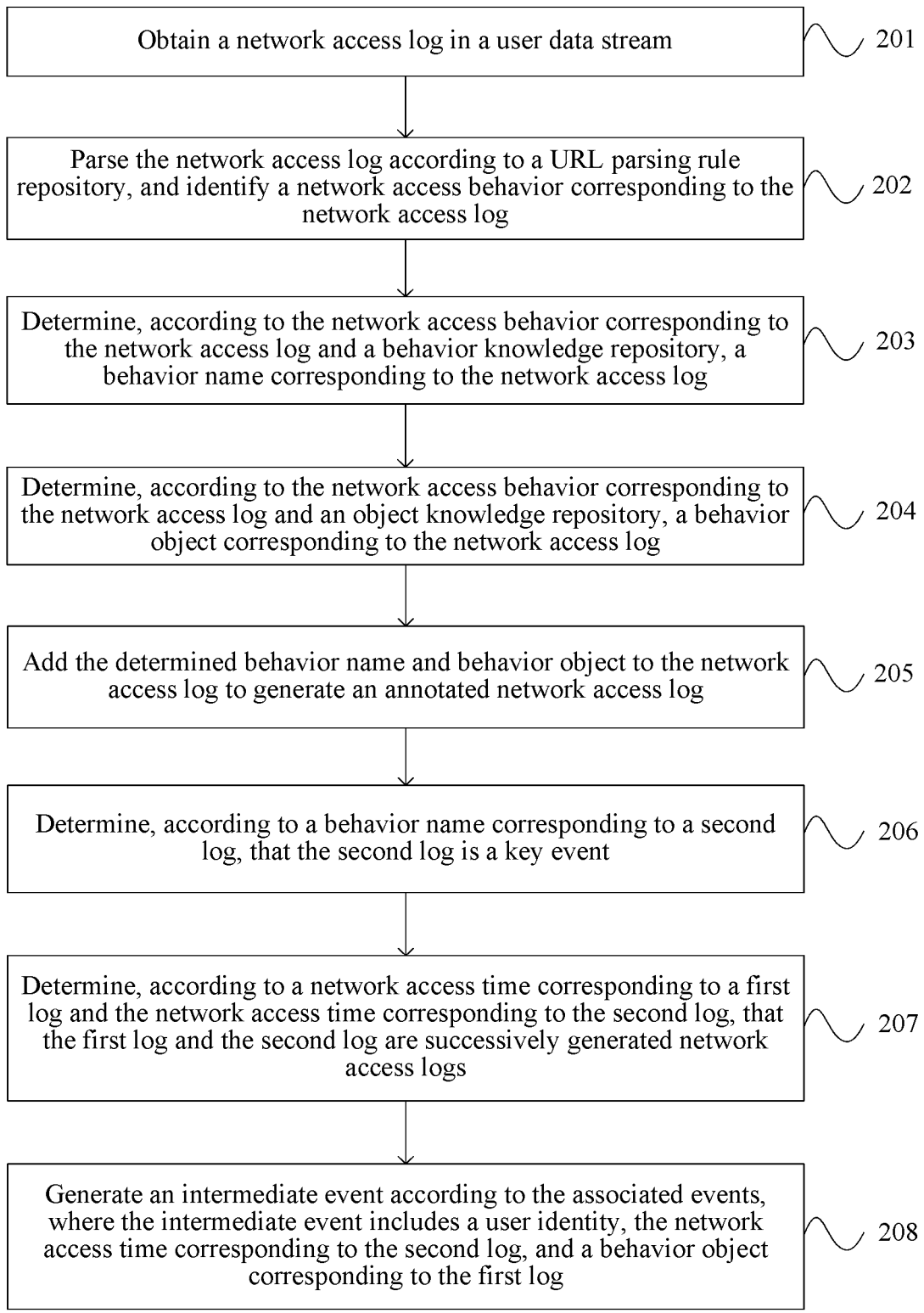
FIG. 3 is a flowchart of a method for identifying a user behavior object based on traffic analysis according to Embodiment 2 of the present disclosure.

FIG. 3 is a flowchart of a method for identifying a user behavior object based on traffic analysis according to Embodiment 2 of the present disclosure. FIG. 3 is a specific implementation of the embodiment shown in FIG. 2, and mainly relates to specific implementations of step 102 and step 103 in the embodiment shown in FIG. 2. As shown in FIG. 3, the method includes the following steps.

Step 201. Obtain a network access log in a user data stream.

In this embodiment, the implementation principle of step 201 is the same as that of step 101 in the embodiment shown in FIG. 2, and details are not described herein again.

Optionally, the network access log is a commercial network access log. In this embodiment, network access logs in the user data stream may be screened in order to obtain a commercial network access log in the user data stream. For example, network access logs of applications, such as TAO-BAO, Tmall.com, and JD.com, in a mobile phone of a user A may be screened out in order to analyze the commercial network access log of the user.

Optionally, in this embodiment, a preset user knowledge repository includes a URL parsing rule repository, a behavior knowledge repository, and an object knowledge repository. A specific implementation method of step 102 in the embodiment shown in FIG. 2 includes step 202 to step 205.

Step 202. Parse the network access log according to a URL parsing rule repository, and identify a network access behavior corresponding to the network access log.

In this embodiment, a URL parsing repository is used to store a URL parsing rule. The parsing rule may further include correspondences between different key strings and different behavior IDs or behavior object categories. Using Table 2 as an example, a key string may be identified based on special IDs such as http://, ?, and &. By parsing a key string search.**.com according to the URL parsing repository, it may be obtained that a corresponding behavior ID is 10001. By parsing a key string mobileSearch, it may be learned that a corresponding behavior object category is mobile phone.

Step 203. Determine, according to the network access behavior corresponding to the network access log and a behavior knowledge repository, a behavior name corresponding to the network access log.

In this embodiment, the behavior knowledge repository stores a correspondence between the behavior ID and the behavior name in order to identify the behavior name corresponding to the network access log. Table 5 is a commercial behavior knowledge repository provided in the present disclosure. With reference to Table 2 and Table 5, if the behavior ID parsed out according to the key string search.**.com in the URL in Table 2 is 10001, it is determined, according to the behavior knowledge repository, that the behavior name corresponding to the network access log is login.

TABLE 5

| Behavior knowledge repository | |
|---|---|
| Behavior ID | Behavior name |
| 10001 | Login |
| 10002 | Commodity search |
| 10003 | Commodity browsing |
| 10004 | Adding to a cart |
| 10005 | Buy now |
| 10006 | Submitting an order |

Step 204. Determine, according to the network access behavior corresponding to the network access log and an object knowledge repository, a behavior object corresponding to the network access log.

In this embodiment, the object knowledge repository is used to identify a specific behavior object corresponding to the network access log. Because a pre-classification of the behavior object is identified according to the URL parsing rule repository, specific commodity information to which the user pays attention further needs to be identified according to the object knowledge repository. For example, the URL parsing repository identifies that categories of commodities to which the user pays attention are mobile phones, mother and baby commodities, and foods. In the network access log shown in Table 2, the URL parsing rule repository identifies, according to the key string mobileSearch, that the commodity category to which the user pays attention is mobile phone, and the object knowledge repository identifies, according to the IPHONE 6s, that a commodity searched by the user includes an IPHONE 6s phone.

Step 205. Add the determined behavior name and behavior object to the network access log to generate an annotated network access log.

In this embodiment, a semantic annotation is performed on the network access log according to the determined behavior name and behavior object in order to generate the annotated network access log. A form of the annotated network access log is shown in Table 4.

Optionally, an implementation method of step 103 in the embodiment shown in FIG. 2 may include step 206 and step 207.

Step 206. Determine, according to a behavior name corresponding to a second log, that the second log is a key event.

In this embodiment, the key event is an event used to determine a user preference. For example, when the user is shopping online, if adding to a cart or submitting an order is performed on a commodity, it indicates that the user needs or likes this commodity. Therefore, the user preference may be determined according to commodity information corresponding to adding to a cart or submitting an order.

Step 207. Determine, according to a network access time corresponding to a first log and the network access time corresponding to the second log, that the first log and the second log are successively generated network access logs.

In this embodiment, determining an associated event not only includes determining the key event, but also needs to determine that the first log and the second log are successively generated network access logs. As shown in Table 4, after it is determined that an annotated network access log corresponding to adding to a cart is the key event, it may be learned, according to a time of the annotated network access log, that a third annotated network access log and a fourth annotated network access log are two successively generated network access logs. Therefore, the third annotated network access log and the fourth annotated network access log are associated events.

Optionally, taking online shopping as an example, before adding to a cart or submitting an order, the user first needs to browse to view commodity information. Therefore, in this embodiment, a behavior name corresponding to the first log is browsing, and the behavior name corresponding to the second log is adding to a cart or submitting an order.

Step 208. Generate an intermediate event according to the associated events, where the intermediate event includes a user identity, the network access time corresponding to the second log, and a behavior object corresponding to the first log.

In this embodiment, the method implementation principle of step 208 is the same as the method implementation principle of step 104 in the embodiment shown in FIG. 2, and details are not described herein again.

The method for identifying a user behavior object based on traffic analysis provided in this embodiment includes obtaining, by an operator server, a network access log in a user data stream, parsing the network access log according to a URL parsing rule repository, identifying a network access behavior corresponding to the network access log, determining, according to the network access behavior corresponding to the network access log, a behavior knowledge repository, and an object knowledge repository, a behavior name and a behavior object corresponding to the network access log separately, adding the determined behavior name and behavior object to the network access log in order to generate an annotated network access log, determining, according to a behavior name corresponding to a second log in the annotated network access log, that the second log is a key event, determining, according to a network access time corresponding to a first log and the network access time corresponding to the second log, that the first log and the second log are successively generated network access logs in order to determine that the first log and the second log are associated events, and generating an intermediate event according to the associated events such that an operator studies interests and preferences of a user by analyzing a behavior object in the intermediate event, and provides a data service for the user according to the interests and the preferences of the user in order to improve service quality of the data service.

Optionally, based on the embodiment shown in FIG. 2 or FIG. 3, after the annotated network access log is obtained, the method may further include extracting target events from the annotated network access log according to the behavior name corresponding to the network access log, and the determining, according to the network access time and the behavior name in the annotated network access log, that a first log and a second log in the annotated network access log are associated events includes determining, according to the network access time and the behavior name in the annotated network access log, that a first log and a second log in the target events are associated events.

In this embodiment, the target events are multiple events whose behaviors are associated with each other and that can determine a user preference. For example, using online shopping as an example, the target events may include events such as commodity search, commodity browsing, adding to a cart, submitting an order, and receipt confirmation in order to analyze only the target events, thereby determining the associated events more quickly, and improving efficiency of identifying a user behavior object.

Optionally, after extracting target events from the annotated network access log, the method may further include dividing the user data stream within a preset time period into multiple data stream segments. Each data stream segment uses the key event as a destination of the data stream.

In this embodiment, a key event of adding to a cart or submitting an order may be used as a destination of each data stream. User data streams in a day are divided into multiple data streams. Each segment of data stream obtained through division may be considered as a data segment which separately uses events such as adding to a cart and submitting an order as features in order to finally play a role similar to "classifying" the data stream, thereby helping manage the user data stream.

Figure 4:
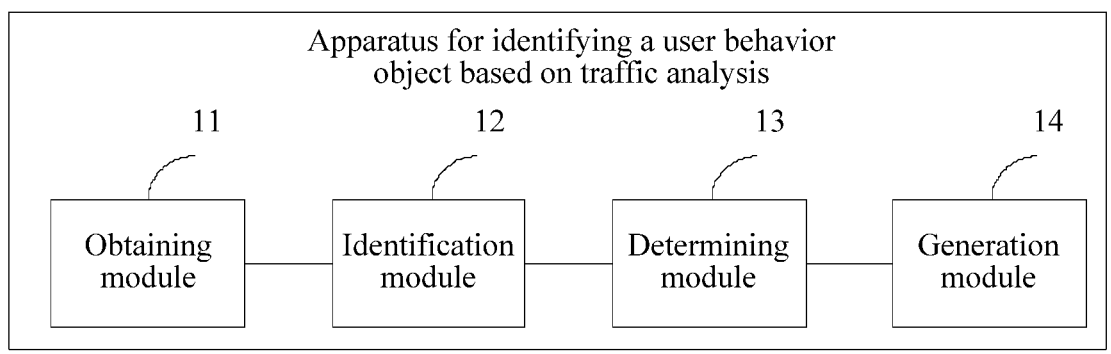
FIG. 4 is a schematic structural diagram of an apparatus for identifying a user behavior object based on traffic analysis according to Embodiment 3 of the present disclosure.

FIG. 4 is a schematic structural diagram of an apparatus for identifying a user behavior object based on traffic analysis according to Embodiment 3 of the present disclosure. As shown in FIG. 4, the apparatus includes an obtaining module 11, an identification module 12, a determining module 13, and a generation module 14. The obtaining module 11 is configured to obtain a network access log in a user data stream. The identification module 12 is configured to identify, according to a preset user knowledge repository, a network access behavior corresponding to the network access log, and perform a semantic annotation on the network access log in order to obtain an annotated network access log. The annotated network access log includes a user identity, a network access time, a behavior name, and a behavior object. The determining module 13 is configured to determine, according to the network access time and the behavior name in the annotated network access log, that a first log and a second log in the annotated network access log are associated events. A behavior object corresponding to the second log is empty. The generation module 14 is configured to generate an intermediate event according to the associated events, where the intermediate event includes the user identity, a network access time corresponding to the second log, and a behavior object corresponding to the first log.

The apparatus in this embodiment may be configured to perform the technical solution of the method embodiment shown in FIG. 2, of which implementation principles and technical effects are similar, and details are not described herein again.

Based on the embodiment shown in FIG. 4, in the apparatus for identifying a user behavior object based on traffic analysis provided in Embodiment 4 of the present disclosure, the determining module 13 is further configured to determine, according to a behavior name corresponding to the second log, that the second log is a key event, and determine, according to a network access time corresponding to the first log and the network access time corresponding to the second log, that the first log and the second log are successively generated network access logs.

Optionally, the preset user knowledge repository includes a URL parsing rule repository, a behavior knowledge repository, and an object knowledge repository. The identification module 12 is further configured to parse the network access log according to the URL parsing rule repository, and identify the network access behavior corresponding to the network access log, determine, according to the network access behavior corresponding to the network access log and the behavior knowledge repository, a behavior name corresponding to the network access log, determine, according to the network access behavior corresponding to the network access log and the object knowledge repository, a behavior object corresponding to the network access log, and add the determined behavior name and behavior object to the network access log to generate the annotated network access log.

Optionally, the network access log is a commercial network access log.

Optionally, a behavior name corresponding to the first log is browsing, and the behavior name corresponding to the second log is adding to a cart or submitting an order.

The apparatus in this embodiment may be configured to perform the technical solution of the method embodiment shown in FIG. 3, of which implementation principles and technical effects are similar, and details are not described herein again.

Figure 5:
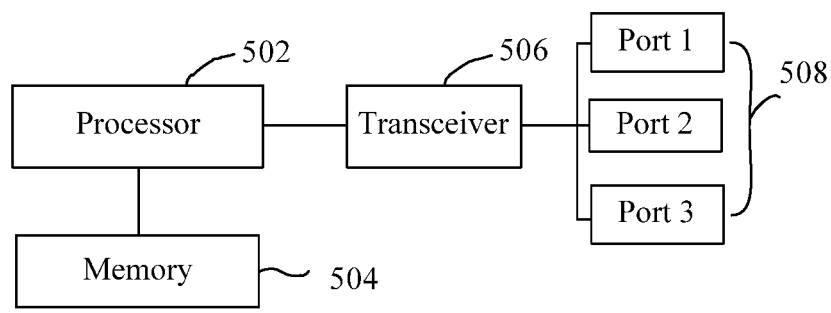
FIG. 5 is a schematic structural diagram of a server according to Embodiment 5 of the present disclosure.

FIG. 5 is a schematic structural diagram of a server according to Embodiment 5 of the present disclosure. The server includes one or more ports 508 (designated as Port 1, Port 2 and Port 3) coupled to a transceiver 506. The transceiver 506 may be a transmitter, a receiver, or a combination thereof, and sends or receives a data packet from another network node using the port 508. A processor 502 is coupled to the transceiver 506, and is configured to process the data packet. The processor 502 may include one or more multi-core processors and/or memories 504. The processor 502 may be a general purpose processor, an application-specific integrated circuit (ASIC), or a digital signal processor (DSP).

The memory 504 may be a non-transitory storage medium and is coupled to the processor 502 in order to store different types of data. The memory 504 may include a read-only memory (ROM), a random access memory (RAM), or another type of dynamic storage device capable of storing information and instructions, or may be a magnetic disk storage. The memory 504 may be configured to store an instruction that implements the related method described in FIG. 2 or FIG. 3.

In another embodiment, the server includes a memory 504, a processor 502, a transceiver 506, and one or more ports 508 coupled to the transceiver 506. The memory 504 is configured to store computer executable program code, and the processor 502 is coupled to the memory 504 and the transceiver 506.

The program code includes an instruction. When the processor 502 executes the instruction, the instruction enables the network element to perform the following operations obtaining a network access log in a user data stream, identifying, according to a preset user knowledge repository, a network access behavior corresponding to the network access log, and performing a semantic annotation on the network access log in order to obtain an annotated network access log, where the annotated network access log includes a user identity, a network access time, a behavior name, and a behavior object, determining, according to the network access time and the behavior name in the annotated network access log, that a first log and a second log in the annotated network access log are associated events, where a behavior object corresponding to the second log is empty, and generating an intermediate event according to the associated events, where the intermediate event includes the user identity, a network access time corresponding to the second log, and a behavior object corresponding to the first log.

The server in this embodiment may be configured to perform the technical solution of the method embodiment shown in FIG. 2 or FIG. 3, of which implementation principles and technical effects are similar, and details are not described herein again.

A person of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for identifying a user behavior object based on traffic analysis, wherein the method comprises:
    obtaining a network access log of a user data stream;
    identifying, according to a preset user knowledge repository, a network access behavior corresponding to the network access log;
    performing a semantic annotation on the network access log to obtain an annotated network access log, wherein the annotated network access log comprises a plurality of user identity entries, a plurality of network access time entries, a plurality of behavior name entries, and a plurality of behavior object entries;
    determining, according to the plurality of network access time entries and the plurality of behavior name entries, that a first log and a second log in the annotated network access log comprise associated events, wherein the first log comprises a first behavior object entry of the plurality of behavior object entries, wherein the second log comprises a second behavior object entry of the plurality of behavior object entries, and wherein the second behavior object entry is empty;
    generating an intermediate event according to the associated events, wherein the intermediate event comprises a first user identity entry of the plurality of user identity entries, a first network access time entry of the plurality of network access time entries corresponding to the second log, and the first behavior object entry; and
    providing a data service for a user based on the intermediate event.

2. The method of claim 1, wherein determining that the first log and the second log comprise the associated events comprises:
    determining, according to the plurality of behavior name entries, that the second log comprises a key event; and
    determining, according to the plurality of network access time entries, that the first log and the second log comprise successively generated network access logs.

3. The method of claim 1, wherein the preset user knowledge repository comprises a uniform resource locator (URL) parsing rule repository, a behavior knowledge repository, and an object knowledge repository, and wherein identifying the network access behavior and performing the semantic annotation comprises:
    parsing the network access log according to the URL parsing rule repository;
    identifying the network access behavior;
    determining, according to the network access behavior and the behavior knowledge repository, the plurality of behavior name entries;
    determining, according to the network access behavior and the object knowledge repository, the plurality of behavior object entries; and
    adding the plurality of behavior name entries and the plurality of behavior object entries to the network access log to generate the annotated network access log.

4. The method of claim 1, wherein the network access log comprises a commercial network access log.

5. The method of claim 4, wherein a first behavior name entry corresponding to the first log comprises browsing, and wherein a second behavior name entry corresponding to the second log comprises adding to a cart.

6. The method of claim 4, wherein a first behavior name entry corresponding to the first log comprises browsing, and wherein a second behavior name entry corresponding to the second log comprises submitting an order.

7. The method of claim 1, wherein the preset user knowledge repository comprises one or more of a uniform resource locator (URL) parsing rule repository, a behavior knowledge repository, and an object knowledge repository.

8. The method of claim 1, wherein performing the semantic annotation comprises:
determining, based at least in part on a behavior knowledge repository, the plurality of behavior name entries;
determining, based at least in part on an object knowledge repository, the plurality of behavior object entries; and
adding the plurality of behavior name entries and the plurality of behavior object entries to the network access log to generate the annotated network access log.

9. An apparatus for identifying a user behavior object based on traffic analysis, wherein the apparatus comprises:
a memory configured to store instructions; and
a processor coupled to the memory, wherein the instructions cause the processor to:
obtain a network access log of a user data stream;
identify, according to a preset user knowledge repository, a network access behavior corresponding to the network access log;
perform a semantic annotation on the network access log to obtain an annotated network access log, wherein the annotated network access log comprise a plurality of user identity entries, a plurality of network access time entries, a plurality of behavior name entries, and a plurality of behavior object entries;
determine, according to the plurality of network access time entries and the plurality of behavior name entries, that a first log and a second log in the annotated network access log comprise associated events, wherein the first log comprises a first behavior object entry of the plurality of behavior object entries, wherein the second log comprises a second behavior object entry of the plurality of behavior object entries, and wherein the second behavior object entry is empty;
generate an intermediate event according to the associated events, wherein the intermediate event comprises a first user identity entry of the plurality of user identity entries, a fist network access time entry of the plurality of network access time entries corresponding to the second log, and the first behavior object entry; and
provide a data service for a user based on the intermediate event.

10. The apparatus of claim 9, wherein the instructions further causes the processor to:
determine, according to the plurality of behavior name entries, that the second log comprises a key event; and
determine, according to the plurality of network access time entries, that the first log and the second log comprise successively generated network access logs.

11. The apparatus of claim 9, wherein the preset user knowledge repository comprises a uniform resource locator (URL) parsing rule repository, a behavior knowledge repository, and an object knowledge repository, and wherein the instructions further cause the processor to:
parse the network access log according to the URL parsing rule repository;
identify the network access behavior;
determine, according to the network access behavior and the behavior knowledge repository, the plurality of behavior name entries,
determine, according to the network access behavior and the object knowledge repository, the plurality of behavior object entries; and
add the plurality of behavior name entries and the plurality of behavior object entries to the network access log to generate the annotated network access log.

12. The apparatus of claim 9, wherein the network access log comprises a commercial network access log.

13. The apparatus of claim 12, wherein a first behavior name entry corresponding to the first log comprises browsing, and wherein a second behavior name entry corresponding to the second log comprises adding to a cart.

14. The apparatus of claim 12, wherein a first behavior name entry corresponding to the first log comprises browsing, and wherein a second behavior name entry corresponding to the second log comprises submitting an order.

15. A computer program product for identifying a user behavior object based on traffic analysis, wherein the computer program product comprises instructions which when executed cause an apparatus to:
obtain a network access log of a user data stream;
identify, according to a preset user knowledge repository, a network access behavior corresponding to the network access log;
perform a semantic annotation on the network access log to obtain an annotated network access log, wherein the annotated network access log comprises a plurality of user identity entries, a plurality of network access time entries, a plurality of behavior name entries, and a plurality of behavior object entries;
determine, according to the plurality of network access time entries and the plurality of behavior name entries, that a first log and a second log in the annotated network access log comprise associated events, wherein the first log comprise a first behavior object entry of the plurality of behavior object entries, wherein the second log comprises a second behavior object entry of the plurality of behavior object entries, and wherein the second behavior object entry is empty;
generate an intermediate event according to the associated events, the intermediate event comprising the user identity, a network access time corresponding to the second log, and a behavior object corresponding to the first log; and
provide a data service for a user based on the generated intermediate event.

16. The computer program product of claim 15, wherein the instructions further cause the apparatus to:
determine, according to the plurality of behavior name entries, that the second log comprises a key event; and
determine, according to the plurality of network access time entries, that the first log and the second log comprise successively generated network access logs.

17. The computer program product of claim 15, wherein the preset user knowledge repository comprises a uniform resource locator (URL) parsing rule repository, a behavior knowledge repository, and an object knowledge repository, and wherein the instructions further cause the apparatus to:
- parse the network access log according to the URL parsing rule repository;
- identify the network access behavior;
- determine, according to the network access behavior and the behavior knowledge repository, the plurality of behavior name entries;
- determine, according to the network access behavior and the object knowledge repository, the plurality of behavior object entries; and
- add the plurality of behavior name entries and the plurality of behavior object entries to the network access log to generate the annotated network access log.

18. The computer program product of claim 15, wherein the network access log comprises a commercial network access log.

19. The computer program product of claim 18, wherein a first behavior name entry corresponding to the first log comprises browsing, and wherein a second behavior name entry corresponding to the second log comprises adding to a cart.

20. The computer program product of claim 18, wherein a first behavior name entry corresponding to the first log comprises browsing, and wherein a second behavior name entry corresponding to the second log comprises submitting an order.

* * * * *